(12) United States Patent
Wu et al.

(10) Patent No.: US 12,190,535 B2
(45) Date of Patent: Jan. 7, 2025

(54) GENERATING DEPTH IMAGES FOR IMAGE DATA

(71) Applicant: Black Sesame Technologies Inc., San Jose, CA (US)

(72) Inventors: Tiecheng Wu, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 400 days.

(21) Appl. No.: 17/688,694

(22) Filed: Mar. 7, 2022

(65) Prior Publication Data

US 2023/0281843 A1 Sep. 7, 2023

(51) Int. Cl.
*G06T 5/50* (2006.01)
*G06T 7/13* (2017.01)
*G06T 7/50* (2017.01)

(52) U.S. Cl.
CPC .............. *G06T 7/50* (2017.01); *G06T 7/13* (2017.01); *G06T 2207/20081* (2013.01)

(58) Field of Classification Search
CPC .... H04N 25/67; H04N 25/673; H04N 25/683; H04N 25/677
USPC ........................................................ 348/241
See application file for complete search history.

(56) References Cited

U.S. PATENT DOCUMENTS

2019/0213481 A1\* 7/2019 Godard ................. G06T 3/4007

OTHER PUBLICATIONS

Wu and Li, U.S. Appl. No. 17/376,027, "Generating Stereo-Based Dense Depth Images," filed on Jul. 14, 2021, 44 pages.
Butler et al., "A Naturalistic Open Source Movie for Optical Flow Evaluation," Computer Vision—ECCV 2012, pp. 611-625.
Liu et al., "SelFlow: Self-Supervised Learning of Optical Flow," (Apr. 19, 2019) [online] (retrieved from https://arxiv.org/abs/1904.09117), 14 pages.
Ma and Karaman, "Sparse-to-Dense: Depth Prediction from Sparse Depth Samples and a Single Image," (Feb. 26, 2018) [online] (retrieved from https://arxiv.org/abs/1709.07492v2) 8 pages.

(Continued)

*Primary Examiner* — Stephen P Coleman
(74) *Attorney, Agent, or Firm* — Fish & Richardson P.C.

(57) ABSTRACT

Methods, systems, and apparatus, including computer programs encoded on computer storage media, for training a machine learning model configured to generate a predicted depth image, comprising receiving data representing training samples that include a plurality of image pairs, each image pair includes a target image and a reference image both capturing a particular scene from different orientations; for each of the plurality of image pairs, generating a compressed cost volume for the image pair; providing the compressed cost volume as an input to the machine learning model; generating, using the machine learning model, output data representing a predicted disparity map for the compressed cost volume; and generating a total loss using the predicted disparity map for the compressed cost volume, the total loss includes a boundary loss, an occlusion loss, and a transfer loss; and updating the plurality of parameters of the machine learning model by minimizing the total losses.

20 Claims, 6 Drawing Sheets

(56) References Cited

OTHER PUBLICATIONS

Mayer et al., "A Large Dataset to Train Convolutional Networks for Disparity, Optical Flow, and Scene Flow Estimation," (Dec. 7, 2015) [online] (retrieved from https://arxiv.org/abs/1512.02134v1), 14 pages.

Wang et al., "Occlusion Aware Unsupervised Learning of Optical Flow," (Apr. 4, 2018) [online] (retrieved from https://arxiv.org/abs/1711.05890), 10 pages.

* cited by examiner

GENERATING DEPTH IMAGES FOR IMAGE DATA

BACKGROUND

This specification relates to image processing, and more particularly, to generating depth images for image data.

In general, a depth image can include pixel-wise information relating to a distance between a first position where a portion of a scene is located (the portion of the scene is captured by image sensors in an original image and represented by corresponding pixels) and a second position (e.g., an observation position) determined by positions of image sensors, for example, a line connecting focal points of two image sensors.

Depth images (e.g., dense depth images that include depth information for each pixel of an image) are widely used in computer graphics and computer vision. Techniques based on depth images can include generating image effects such as simulating shallow depths of field by blurring pixels in the original images to various degrees, simulating fog effect for objects in the original images, generating suitable shadows and shades for objects in the original images, generating 3D models from 2D images, and rendering 3D scenes using Z-buffering and Z-culling, to name just a few examples. Furthermore, in some implementations, depth images can be used for localization, movement control, or pose control.

Conventional methods for extracting depth information to generate depth images from a scene can be generally classified into two categories—active methods and passive methods. Active methods, in general, relate to emitting light signals such as light beams or laser beams to objects in a scene and measuring respective round-trip time periods for the light signals. Techniques and sensors using the active methods include Time-of-flight (TOF) cameras and Light Detection and Ranging (LIDAR) methods. Passive methods, on the other hand, generally relates to generating multiple original images (e.g., one reference original image, and one or more target original images) for a particular scene using two or more sensors (e.g., stereo cameras) with known relative displacements and poses, and generating a depth image for the original images by minimizing photometric differences after projections (e.g., rectification).

Artificial intelligence (AI) is intelligence demonstrated by machines and represents the ability of a computer program or a machine to think and learn. One or more computers can be used to train multiple machine learning models based on training samples, and perform inference operations of each of the multiple trained machine learning models to process model inputs and generate model outputs.

Neural networks belong to a sub-field of machine-learning models. Neural networks can employ one or more layers of nodes representing multiple computations. One or more computers can be configured to perform computations of the neural networks to generate an output, e.g., a classification, a prediction, or a segmentation for a received input. Some neural networks include one or more hidden layers in addition to an output layer. The output of each hidden layer is used as input to the next layer in the network, i.e., the next hidden layer or the output layer. Each layer of the network generates an output from a received input in accordance with the current values of a respective set of network parameters.

SUMMARY

The techniques described in the following specification relate to training a machine learning model based on training samples. The trained machine learning model can be deployed to generate an output prediction of depth images for input image data.

Existing passive methods can be used to generate depth images by carefully designing cost volume functions and filters to determine disparity values, and generating depth images based on the determined disparity values. The cost volume functions can be designed to include different penalty terms to constrain discontinuity across objects in the depth map. For example, one existing passive method generates depth images by minimizing photometric differences (e.g., costs) with constraints in pixel matching processes and smoothness constraints in optimization processes. More specifically, the smoothness constraints are used to uniformly penalize discontinuities in depth values for all pixels in depth images. Another example passive method includes smoothness constraints for depth discontinuity based on pixel-wise color information. However, the designed cost volumes and filters can lead to inaccurate depth images due to "defected" penalty terms. The "defected" penalty terms, for example, can be uniform for all pixels, or based on respective pixel-wise color information. The depth images generated based on these penalty terms often cannot be suitably related to corresponding objects presented in the original images, or can include substantial discontinuities within the same objects presented in the original images, to name just a few examples.

The techniques described in this specification are related to establishing and training a machine learning model on training samples to accurately predict depth images for input image data. Machine learning methods are known for superior performances, high accuracy, and great robustness for image processing, and can also eliminate inaccuracies caused by designed cost volume functions and filters. However, historically machine learning methods have rarely, if ever, been adopted for generating depth images for image data due at least in part to some training challenges, for example, insufficient labeling/annotations, mislabeling (e.g., a discrepancy between annotated pixels and real pixels in input images), and requirements for intensive computation resources and heavy computation. The described techniques can resolve the above-noted problems and soothe the long-felt need for implementing machine learning techniques (or AI methods) to generate depth images.

The term "sensor" as used throughout the specification stands for all kinds of suitable optical sensors for obtaining information for a scene. For example, the sensors can include an image sensor (e.g., digital single-lens reflex (DSLR) cameras), a laser sensor, or a video sensor.

The term "original image" throughout the specification stands for data collected by the aforementioned sensors. For example, the original images can include image data corresponding to a photo or a video clip captured by the DSLR camera.

The term "boundary pixel" as used throughout the specification stands for a pixel substantially representing a boundary of an object with respect to a background, or a boundary for an object of two or more partially overlapped or intersected objects captured in the original images. More specifically, boundary pixels for an object can include pixels at the outermost edge of an object presented in the original image. In addition, the boundary pixels can include pixels of a particular width. For example, the boundary pixels can have a width of a single pixel, two pixels, or five pixels from the periphery of the object. The width of boundary pixels can be determined based on the size of the object, the size of the original images, or the resolution of the original images.

The term "occlusion area" (also referred to as "occlusions," "occluded area," or "occlusion pixels") as used throughout the specification stands for a region or an area that includes one or more pixels representing a portion of one or more objects that is captured in an image by one of a sensor but not by the other sensor in a pair of sensors (e.g., stereo image sensors). The occlusion area generally represents a covered or hidden portion of an object by another object in a scene, usually, the other object is positioned closer than the object from the image sensors.

The term "cost function" as used throughout the specification stands for a target function representing photometric differences to be minimized for generating a depth image from an input image. The cost function can receive input positions for each pixel in the original images, directions for generating cost paths, and particular disparity levels, and output particular values (e.g., a cost value) representing a measure of the photometric differences. The term "cost values" represent values as output from a cost function for processing particular inputs (e.g., a particular pixel at a particular disparity level). In general, the cost function can generate a respective cost value for each pixel in an input image (e.g., a reference image in an image pair). The described techniques relate to optimizing the functional form of a cost function for generating an accurate depth image, details of which are described below.

The term "cost volume" as used throughout the specification stands for a data structure that stores cost values generated from respective cost functions at different disparity levels for different pixels in an input image. The cost volume can be compressed by the techniques described in this specification to generate a "compressed cost volume," which stores fewer cost values for each pixel in the input image. The cost volume and corresponding compressing/filtering process are described in greater detail below.

For simplicity, throughout this specification, the terms "original image" and "cost value" may be referred to simply as an image and cost, respectively.

Particular embodiments of the subject matter described in this specification can be implemented to realize one or more of the following advantages.

The techniques described below can improve the accuracy of generating a depth map from one or more images representing a scene. More specifically, the techniques described below implement a trained machine learning model to generate depth map predictions, which does not require human-designed penalty terms or cost functions. In this way, the modeling of the machine learning techniques eliminates ambiguity when determining factors that are intrinsic for stereo vision, and therefore improves the accuracy for generating depth images. Moreover, machine learning models are more robust to process different input images or training samples, e.g., images of different scenes with different numbers, sizes, colors, and positions of objects, different backgrounds, different context light conditions or weather conditions, and different image quality.

Machine learning models are generally immune to or can self-correct outlier training samples or a limited number of mislabelings, which further enhances the accuracy. In addition, the implemented machine learning model is trained with the total loss function that is determined based on considerations of multiple aspects/constraints to improve accuracy. The total loss function provides semantic-based constraints to the stereo vision problem and facilitates the learning of generating depth maps with high quality and accuracy. In particular, the total loss is generated based at least on predicted boundary pixels, occlusion region, and style-transfer based on benchmark depth images. Because the accuracy of the predicted depth image is improved, the described techniques can further generate better and appealing Depth-of-Field (DOF) data that are render-engine friendly and have sharp depth boundaries.

Moreover, the techniques described below can further improve the computation efficiency. Training a machine learning model generally requires intensive training samples, which therefore demands high computation resources such as memory size, memory bandwidth, and computation power. However, the techniques described in this specification can reduce the size of input data to the machine learning model by compressing a data structure that stores cost values associated with pixels in input images, e.g., compressed cost volumes. Such a compressing process can reduce computation cost but maintain a high level of accuracy when generating depth images. Moreover, boundary pixel predictions are generated using another machine learning model that is pre-trained, and the pre-trained machine learning model processes input without the need of identifying texture and classification information for the input images. Therefore, the described techniques can be performed with less computation power and memory size, and the trained machine learning models can be deployed on edge devices such as smart cell phones, tablets, and smartwatches.

Furthermore, the techniques described below can be easily scaled up and pipelined for efficiently processing larger input images, or a large number of input images. More specifically, the training process can be pipelined and implemented in a distributed manner. For example, the training can be performed by cloud services in a distributed database. As another example, the training can be performed in a federated manner (e.g., federated learning) which provides sufficient privacy for user data. The training process, or more specifically, the backward updating process, can be distributed to different processors, clusters, computing units with different memory and bandwidth and be performed in parallel.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
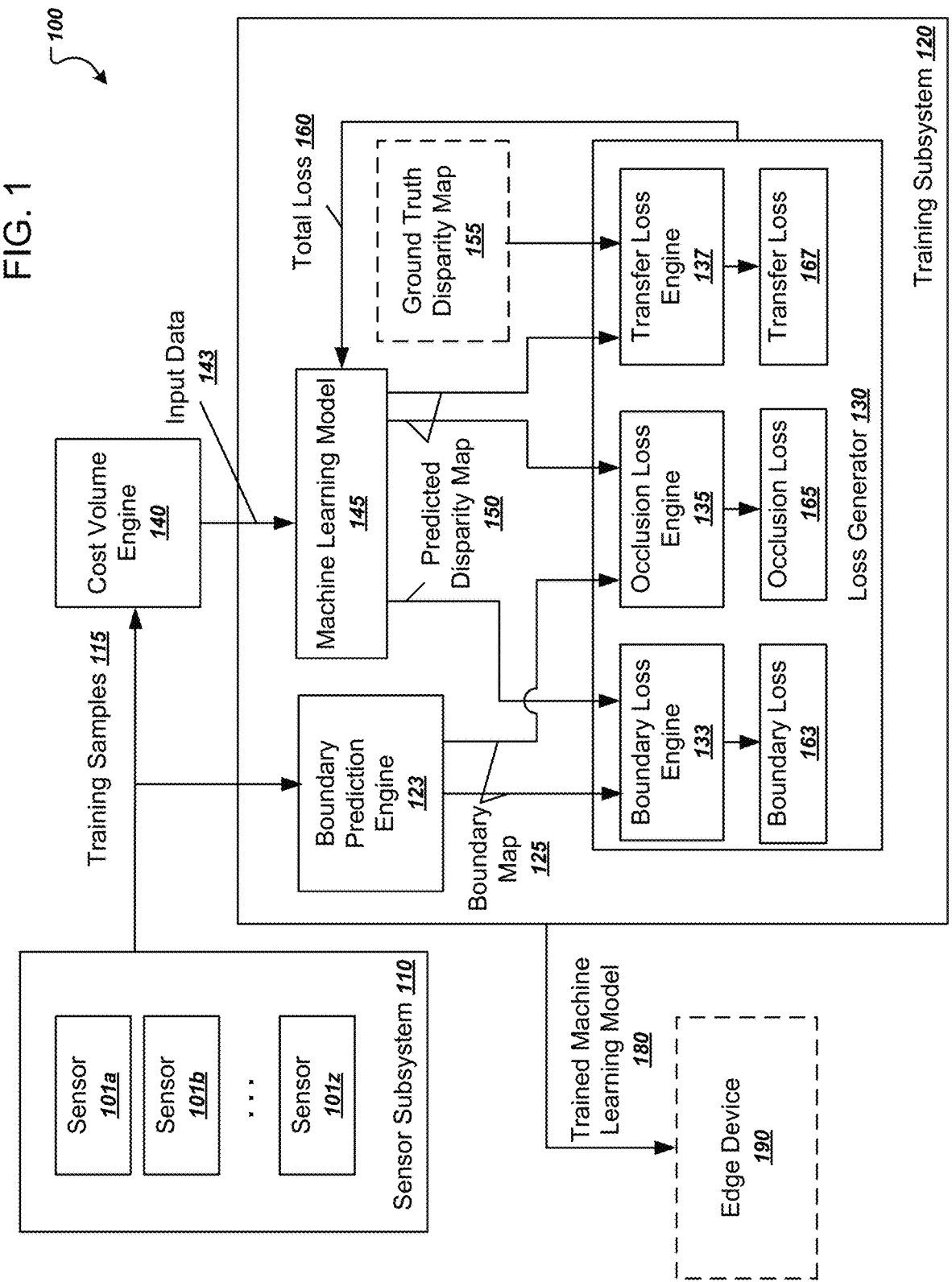
FIG. 1 illustrates an example system configured to train a machine learning model for generating depth images for training samples.

Although depth images have been used in different applications and hardware, e.g., smartphones, tablets, game consoles, robotic controls, and autonomous vehicle navigation systems, it is challenging to use machine learning techniques to generate the depth images. This is due in part to the high demand for computation power, correct labeling or data labeling techniques (e.g., supervised learning), and massive training samples. For example, most existing trained machine learning models require tremendous computation resources for inference computations, and are not suitable to be deployed on edge devices, because edge devices such as smartphones or in-situ chips on autonomous vehicles generally cannot satisfy the computation power requirement. As another example, supervised training methods generally are not suitable for training machine learning models for predicting depth maps because the labeling process is error-prone, and external measurement tools such as LIDAR and stereo cameras can invite inaccuracies to collected data due to context light conditions (e.g., bad weather, low IR reflection, or light flare), sparsely distributed data, and working condition restrictions.

Unsupervised learning can be used to eliminate the need for labeling for input data, or to provide a training process that is robust to mislabeling. For example, one existing technique can generate virtual 3D scenes using computer graphics. The depth information of the virtual 3D scenes is first stored and rendered from two different points of view to generate an image pair (e.g., a pair of images each capturing the scene from a respective point of view). Image pairs generated this way can avoid labeling errors. However, the process of generating virtual 3D scenes is costly and time-consuming, and the generated virtual 3D scenes only cover a few scenes of interest. Moreover, the rendered image pairs differ from realistic images taken by physical sensors, and as a result, the trained machine learning models based on generated virtual 3D scenes are not readily transferred to process realistic image data.

Other existing techniques such as self-supervised learning can have difficulty determining intrinsic terms in texture-free regions, repetitive patterns, and imaging noises in image data. In addition, due to the positions of image sensors (e.g., stereo cameras), each image of an image pair captured by the image sensors can have at least a portion of regions that are occluded from the other image (e.g., a portion of one or more objects being hindered by one or more other objects). Occlusion areas can cause inaccuracies when generating depth images, therefore, particular treatments are generally required to improve the inaccuracies introduced by the occluded area.

The techniques described in this specification are advantageous over the existing techniques as they can resolve at least the above-noted problems. One aspect of this invention relates to a method for training a machine learning model configured to generate a prediction of a depth map for an input image. The machine learning model can include a plurality of parameters to be updated/learned during the training process. The machine learning model can include a neural network, which includes a plurality of network layers, and each layer can include multiple nodes, each associated with respective nodal parameters.

The operations in the method include receiving training samples to train the machine learning model. The training samples have multiple image pairs. Each image pair includes a reference image and a target image, both generated by respective sensors when capturing a scene from respective orientations.

The operations in the method further include generating a compressed cost volume for the image pair, using the machine learning model to process the compressed cost volume to generate a predicted disparity map, generating a total loss for the image pair based on the predicted disparity map, and updating model parameters by minimizing the total losses for all the training samples. The total loss includes a boundary loss, an occlusion loss, and a transfer loss.

Other embodiments of this aspect include corresponding computer systems, apparatus, and computer programs recorded on one or more computer storage devices, each configured to perform the operations of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

FIG. 1 illustrates an example system 100 configured to train a machine learning model 145 for generating depth images for training samples. The example system 100 is a system implemented on one or more computers in one or more locations, in which systems, components, and techniques described below can be implemented. Some of the components of the system 100 can be implemented as computer programs configured to run on one or more computers. The machine learning model 145 can be any suitable model configured to generate depth images after being trained on suitable training samples. The machine learning models can include regression models, multilayer perceptron models, and neural networks. The examples of the machine learning models are described in more detail below.

As shown in FIG. 1, the system 100 can include a training subsystem 120 configured to train a machine learning model 145 using training samples 115. The trained machine learning model 145 can be configured to generate predictions. The predictions can include predictions of depth information (e.g., depth image) that is used by other applications or procedures. The training samples 115 can include original images captured by one or more sensors, multiple pairs of images for stereo-based analysis, or filtered images according to particular image processing requirements.

In some implementations, the system 100 can include a sensor subsystem 110 having multiple sensors 101a-101z (e.g., cameras) configured to collect image data (e.g., images or videos) of a particular scene and provide the collected image data to the training subsystem 120 as training samples 115. The sensor subsystem 110 can include an audio-visual (AV) device (e.g., an AV streaming mixer that includes or communicably connects with multiple cameras, or a mobile device (e.g., smartphones, tablets, or laptops) including multiple cameras, to name just a few examples.

The sensor subsystem 110 can pre-process the collected image data to generate training samples 115. For example, the sensor subsystem 110 can filter the image data based on criteria such as image quality and the required number of images, or generate multiple image pairs for the training subsystem 120. Each of the multiple image pairs can include a reference image captured by a first sensor for a scene, and a target image captured by a second sensor for substantially the same scene, yet the second sensor is located in a different position from the first sensor.

The system 100 can further include a cost volume engine 140 configured to process the training sample 115 to generate input data 143 to be provided to the training subsystem 120. The cost volume engine 140 is configured to generate a cost volume for each pair of images. A cost volume for an image pair can be a data structure that generally stores multiple cost values for each pixel in one image of the image pair (e.g., the reference image). The cost volume engine 140 can compress the cost volumes for the image pairs to generate compressed cost volumes as the input data 143, which are also data structures but store only a portion of the cost values for each pixel in the image pairs. In this way, the input data 143 can have a smaller size and require less memory bandwidth than the un-compressed cost volumes. The details of generating the cost volumes and compressed cost volumes are described in connection with FIG. 2.

To train the machine learning model 145, the training subsystem 120 can process the received training samples 115 (e.g., image pairs) directly using a boundary prediction engine 123 to generate a boundary map 125. The training subsystem 120 can further provide the input data 143 (e.g., compressed cost volumes) as an input to the machine learning model 145 to generate a predicted disparity map 150. The boundary prediction engine 123 can include a pre-trained machine learning model (e.g., a neural network) configured to generate predictions for boundary pixels. For example, the predictions for boundary pixels can include data representing probabilities that pixels in the reference images are boundary pixels for respective objects, as described above. The predictions for boundary pixels for reference images of image pairs are represented as boundary maps 125, which includes data representing a probability for each pixel of being a boundary pixel in an image. The probability can range from zero to one, with zero representing a pixel being the least likely (or substantially impossible) to be a boundary pixel, and one representing a pixel most likely (or substantially surely) to be a boundary pixel. The process of generating the boundary map 125 is described in greater detail in connection with FIG. 3.

The training subsystem 120 further includes a loss generator 130 configured to generate a total loss 160 for the training of the machine learning model 145. In particular, the total loss 160 serves as an objective to be minimized during backward operations of the training process. The parameters of the machine learning model 145 (e.g., nodal weights for hidden layers when the machine learning model is a neural network) are updated as a result of minimizing the objective during the backward operations.

The loss generator 130 includes a boundary loss engine 133, an occlusion loss engine 135, and a transfer loss engine 137, each of which is configured to generate respective losses based at least on the predicted disparity map 150. More specifically, the boundary loss engine 133 is configured to generate a boundary loss 163 using the boundary map 125 and predicted disparity map 150 for a given image pair. The occlusion loss engine 135 is configured to generate an occlusion loss 165 using the boundary map 125 and predicted disparity map 150 corresponding to the given image pair. The transfer loss engine 137 is configured to generate a transfer loss 167 using the predicted disparity map 150 and a ground truth disparity map 155 corresponding to the given image pair. The ground truth disparity map 155 can be a disparity map generated by virtual 3D scenes using computer graphics techniques, as described above, or other disparity maps that have ground-truth labeling. The ground truth disparity map 155 can be stored in memory units included in the training subsystem 120, or be provided to the training subsystem 120 as part of input data.

The loss generator 130 can generate the total loss 160 for updating the model parameters by combining the boundary loss 163, the occlusion loss 165, and the transfer loss 167. The combination can be a weighted sum of the three different losses. The weight before each of the three losses can be predetermined based on the training requirements, as long as all three weights sum up to one. For example, the boundary loss 163 can have a weight of $5/6$, the occlusion loss 165 can have a weight of $1/12$, and the transfer loss 167 can have a weight of $1/12$, so that the summed weights equate to one. Alternatively, the system 100 can set one or more losses with respective weights being zero (e.g., suppressing one or more losses) at a first stage of training (e.g., training the machine learning model 145 using a first subset of training samples), and turn on the suppressed losses at a second stage of training (e.g., training the machine learning model 145 using a second subset of training samples) by setting the respective weights to be greater than zero. For example, at a first training stage, the system 100 can set the weight for the transfer loss 167 as zero, and set respective weights for the boundary loss 163 and occlusion loss 165 based on training requirements, as long as the summed two weights are equal to one. In some training cases, the system can train a machine learning model with higher accuracy by suppressing one or more types of losses at one or more training stages at the cost of a longer training period.

For each time step, the training subsystem 120 can adjust one or more parameters of the machine learning model 145 so that at the next time step, the total loss 160 can be decreased. The parameters are determined as converged according to predetermined criteria, e.g., derived values of one or more parameters satisfy a particular threshold value. For example, in response to a determination that the change or change rate of the parameters between a current time step and a next time step is below a threshold value. As another example, a determination that a change or change rate of the total loss between a current time step and a next time step is below a threshold value.

When the parameters are converged, the training subsystem 120 can provide the machine learning model 145 with converged parameters as the trained machine learning model 180. The trained machine learning model 180 can be used to perform inference operations to process an input image and generate a depth image for the input image. Because the machine learning model 145 is trained using compressed cost volumes, the requirement for computation power is also decreased for performing inference operations. Therefore, the trained machine learning model 180 can be deployed on edge devices 190 such as smart cells, tablets, and smartwatches, which generally do not have intensive computation power as a computation workstation. In some implementations, an edge device is a control unit or a control processor installed in an autonomous vehicle. The inference operations are performed using the trained machine learning model 180 with the updated or converged parameters, and these parameters are generally not changed or updated during the inference operations. The details of inference operations are described below.

An edge device 190 can process input image data using the deployed trained machine learning model 190 to generate output data (e.g., depth images or disparity images) with the depth information, and provide the output data to another module, device, system, or subsystem (internally or externally associated with the edge device 190) for further analysis or operations. For example, a module internally associated with the edge device 190 can include an image blur module 190 that is configured to process the received depth information for images and blur corresponding pixels in the images to replicate a depth of field effect, i.e., the pixels in the image that are located in a farther location of a scene or not around the focal distance of the camera can be automatically blurred by the image blur module 190. As another example, a system external to the edge device 190 can include a 3D modeling system configured to generate a 3D model for the scene captured by 2D images.

Referring back to image pairs of the training samples 115, the sensor subsystem 110 can generate image pairs from image data collected by sensors 101a-101z (also numbered as 101 for multiple sensors), as described above. More specifically, the sensor subsystem 110 can arrange sensors 101 at different locations for capturing respective images presenting substantially the same scene, set a first image by the first sensor 101a as a reference image, set a second image by the second sensor 101b as a target image, and generate a first image pair including the first image and second image. In general, the sensor subsystem 110 can set multiple images captured by respective sensors as reference images and pair the reference images with one or more target images captured by other sensors to form multiple image pairs. In some implementations, the training samples 115 includes only respective images captured by respective sensors, and it is the cost volume engine 140 that generates image pairs for further operations based on the training samples 115.

Figure 2:
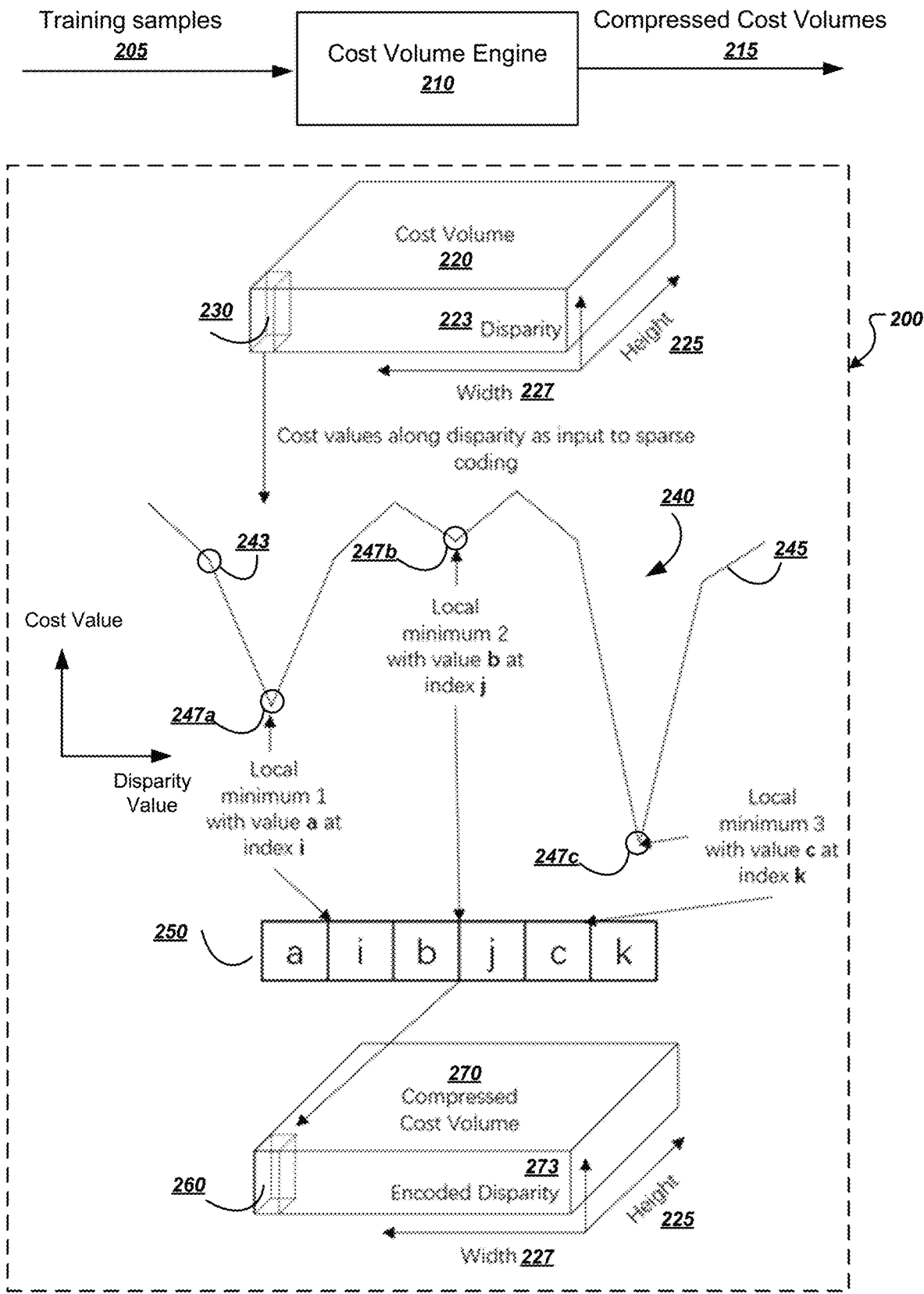
FIG. 2 illustrates an example process of generating a compressed cost volume.

FIG. 2 illustrates an example process 200 of generating a compressed cost volume 270. The cost volume engine 210 can be, for example, the cost volume engine 140 of FIG. 1. For convenience, the process can be performed by a system of one or more computers located in one or more locations. For example, a system 100 of FIG. 1, appropriately programmed, can perform the process to generate a compressed cost volume 270.

The cost volume engine 210 is configured to process the training samples 205 (e.g., the training samples 115 of FIG. 1) to generate compressed cost volumes 215 (e.g., to be provided as input data 143 of FIG. 1). As shown in FIG. 2, the cost volume engine 210 can generate a cost volume 220 for a reference image of an image pair based on a pixel's position and a respective disparity level for the pixel. For example, x represents a position (e.g., coordinate) along the width direction 227, y represents a position along a height direction 225, and each pixel located at a respective width x and height y coordinate can have a respective cost value at each disparity level along the disparity axis 223 (e.g., z). Example details of generating cost values based on a particular cost function for all potential disparity levels can be found in U.S. patent application Ser. No. 17/376,027, incorporated here by reference.

The cost volume engine 210 can further perform morphological analysis over disparity levels and corresponding candidate cost values for all pixels of the reference image. As shown in FIG. 2, the cost volume engine 210 can generate a waveform 240 for a pixel in a reference image. The cost volume engine 210 can generate the waveform based on the respective candidate cost values and associated disparity levels. As an example, the waveform 240 can include a two-dimensional data structure with values along the vertical direction representing cost value for the pixel, and values in the horizontal plane representing the disparity level associated with the cost value.

As another example, the waveform 240 for the pixel can be a discrete line function representing the respective disparity levels and corresponding candidate cost values. As shown in FIG. 2 and without losing generality, the waveform 240 for a pixel in a reference image can be plotted as a line graph 245 in a 2D coordinate frame, in which the horizontal axis represents disparity and the vertical axis represents cost value generated at a corresponding disparity level. In this waveform 240 for the pixel, each vertex (e.g., a vertex numbered as 243) represents a pixel 230 at a possible disparity level and a cost value obtained from the respective cost volume generated at the disparity level. Example details of generating the waveform can also be found in U.S. patent application Ser. No. 17/376,027.

The cost volume engine 210 can identify local minima along the waveform 240. As shown in FIG. 2, the cost volume engine 210 can identify a first local minimum 247a with value a at an index i, a second local minimum 247b with value b at an index j, and a third local minimum 247c with value c at index k. Although there are three local minima shown in the waveform, it should be noted that the waveform can include one, two, or more than three local minima, for example, five, ten, twenty, and more.

The cost volume engine 210 selects the one or more local minima 247a-c as the selected cost values for generating a compressed cost volume 270. For example, the cost volume engine 210 can select first K local minimal cost values in increasing order, and store the first K local minimal cost values with their corresponding indices in a data structure (e.g., a vector data structure 250 shown in FIG. 2). The first two terms in the data structure 250 can represent the first local minimum in order and the index for the local minimum. Similarly, the second two terms can represent the second local minimum and its corresponding index, and the third two terms can represent the third local minimum and its corresponding index. Therefore, the generated vector data can have a length of 2K (or a 2K channel) for each pixel. For waveforms that have n<K local minima, the cost volume engine 210 can first select the n local minima, sort the remaining local minima that are not selected yet in an order (e.g., an increasing order), and select the first K-n local minima to append the n local minima. The value for K can be determined based on particular training needs, predetermined by a user or by the system, for example, K can have a value 4, 8, 10, 16, 32, or any other suitable values.

After storing the local minima in data structures for all pixels in the reference image, the cost volume engine 210 can generate the compressed cost volume 270 based on the stored local minima. The compressed cost volume 270 can be a tensor type data structure, similar to the data structure of the cost volume 220 but with the disparity axis replaced with the encoded disparity 273. For each pixel 260 located at a particular width and height coordinates, the compressed cost volume 270 represents the vector data structure 250 that stores the selected K local minima and their corresponding indices. The system can identify corresponding disparity levels for the compressed cost volume 270 based at least in part on the indices.

The compressing process can uniquely encode cost volumes into compressed cost volumes, and therefore reduce the memory size and bandwidth requirement for training the machine learning model 140 and performing the inference operations of the trained machine learning model 180. Although the compressed cost volume includes fewer cost values than the original cost volumes, it should be noted that the resolution of image input (i.e., pixel resolution in both width and height directions) is preserved. Therefore, depth images generated based on compressed cost volumes do not lose quality and can provide depth information with the same resolution as input images.

Figure 3:
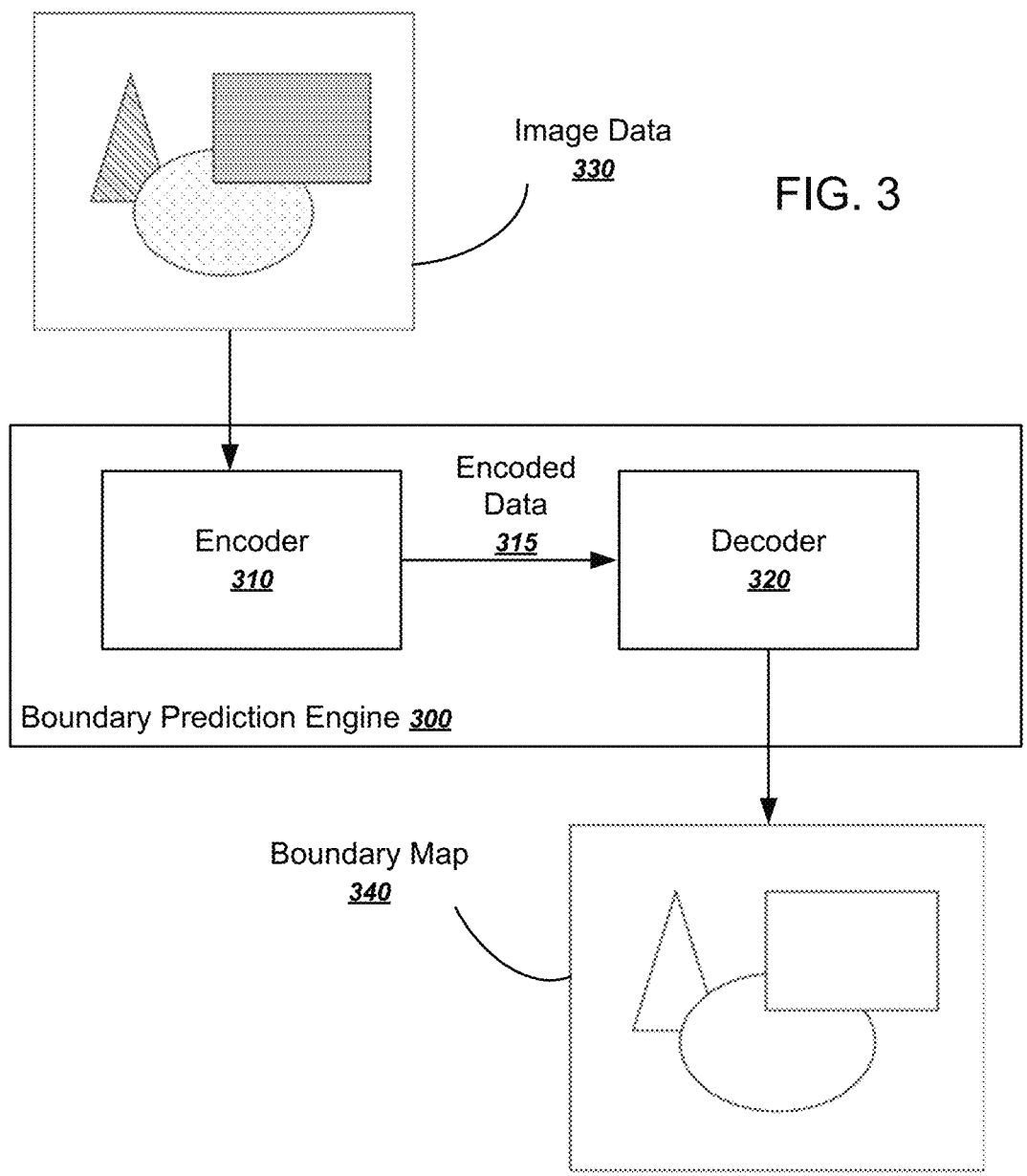
FIG. 3 illustrates an example boundary prediction engine configured to generate boundary maps for input image data.

FIG. 3 illustrates an example boundary prediction engine 300 configured to generate boundary maps 340 for input image data 330. The boundary prediction engine 300 can be, for example, the boundary prediction engine 123 of FIG. 1. For convenience, the process can be performed by a system of one or more computers located in one or more locations. For example, a system 100 of FIG. 1, appropriately programmed, can perform the process to generate a boundary map 340.

The boundary prediction engine 300 can be configured to include one or more suitable pre-trained machine learning models. For example, the pre-trained machine learning models can include neural networks such as convolutional neural networks, fully convolutional networks (FCNs), and fully connected layers.

The machine learning models can further include an encoder 310 and a decoder 320. The encoder 310 can be a neural network including one or more neural network layers. For example, the one or more neural network layers can include convolutional layers followed by a fully connected layer. The encoder can receive input image data 330 (e.g., an image pair or image frame) and map the input data to a feature map (or embeddings for processing natural language), represented by one or more vectors and tensors with real numbers. The encoder 310 can output encoded data 315, characterizing the above-noted feature map, to the decoder 320. The decoder 320 can also be a neural network including one or more neural network layers, yet these layers in the decoder are usually organized in an opposite orientation than those layers in the encoder 310. For example, the decoder 320 can include a fully connected layer followed by one or more convolution transpose layers. The decoder 320 can process the received encoded data 315, and generate a prediction for each pixel in the input image based on the feature map. The generated prediction can be a boundary map 340. The boundary map can include pixel-wise predictions of whether a pixel is a boundary pixel. In some implementations, the decoder 320 can generate a reconstructed output image substantially matching the input image with segmented predictions (e.g., pixel-wise predictions). As a specific example, the encoder 310 and decoder 320 can be configured according to a UNet architecture, i.e., a symmetric architecture across two portions. Example details of encoder 310 and decoder 320 can be found in the U.S. patent application Ser. No. 17/376,027, incorporated here by reference.

The pre-trained machine learning model in the boundary prediction engine 300 can be trained using particular training samples and following conventional training steps. The training examples can include images including pixels associated with boundary information, e.g., labeled by computers or users. The training process can be based on a loss function representing a discrepancy between the labeling of the input data and predicted labeling of the reconstructed output data, e.g., errors of predicting boundary pixels given known labeling. In general, any suitable loss functions can be used for training the machine learning models, such as hinge loss and log loss, to name just a few examples.

The boundary prediction engine 300 ignores the texture and classification information for performing inference operations, therefore, the generation of predictions for boundary pixels (e.g., boundary map 340) using the pre-trained machine learning model can be more robust and efficient.

The boundary prediction engine 300 provides the boundary map 340 to the loss generator (e.g., loss generator 130 of FIG. 1) to generate a boundary loss. Referring back to FIG. 1, the loss generator 130 includes a boundary loss engine 133, which is configure to process the boundary map 125 (e.g., equivalent to the boundary map 340 of FIG. 3) for an input training sample 115 (e.g., an image pair) and the predicted disparity map 150 for the image pair. The boundary loss engine 133 can generate a boundary loss 163 after processing the boundary map 125 and the predicted disparity map 150.

More specifically, the boundary loss engine 133 can normalize the boundary map 125 with pre-determined parameters to generate an enhanced boundary confidence map. This is because the normalization process can generally enhance the predicted confidence score associated with the boundary map 125 and predict as many real boundary pixels as possible. One example normalization process can be represented in Equation (1) below:

$$P_b = \min(\max(2*\text{boundary\_model\_output}, 0), 1) \quad \text{Equation (1)}$$

The term $P_b$ of Equation (1) represents the normalized probability of a pixel to be a boundary pixel. The term boundary_model_output of Equation (1) represents the pixel-wise prediction of the boundary map 125.

The boundary loss engine 133 can generate disparity gradients based on the predicted disparity map 150. For example, the boundary loss engine 133 can apply one or more Sobel filters on the predicted disparity map 150. The Sobel filter is a type of filter to determine the edges in an image, which is generally similar to methods of determining a slope of function based on two points on the function. A Solver filter is typically implemented in a neural network as an activation layer and is a precursor for image identification.

Based on the normalized probability $P_b$ and disparity gradients, the boundary loss engine 133 can generate the boundary loss 163 following a boundary loss function represented in Equation (2) below:

$$\text{Loss}_b = (|\nabla x| + |\nabla y|) * (1 - P_b) \quad \text{Equation (2)}$$

The term $\text{Loss}_b$ of Equation (2) represents the boundary loss 163, and the gradient terms $\nabla x$ and $\nabla y$ are the disparity gradients (or depth gradients) along the x or y direction in the image pair. The boundary 163 will be combined with one or more other losses by the loss generator 130 to generate the total loss 160 for the training of the machine learning model 145.

Figure 4:
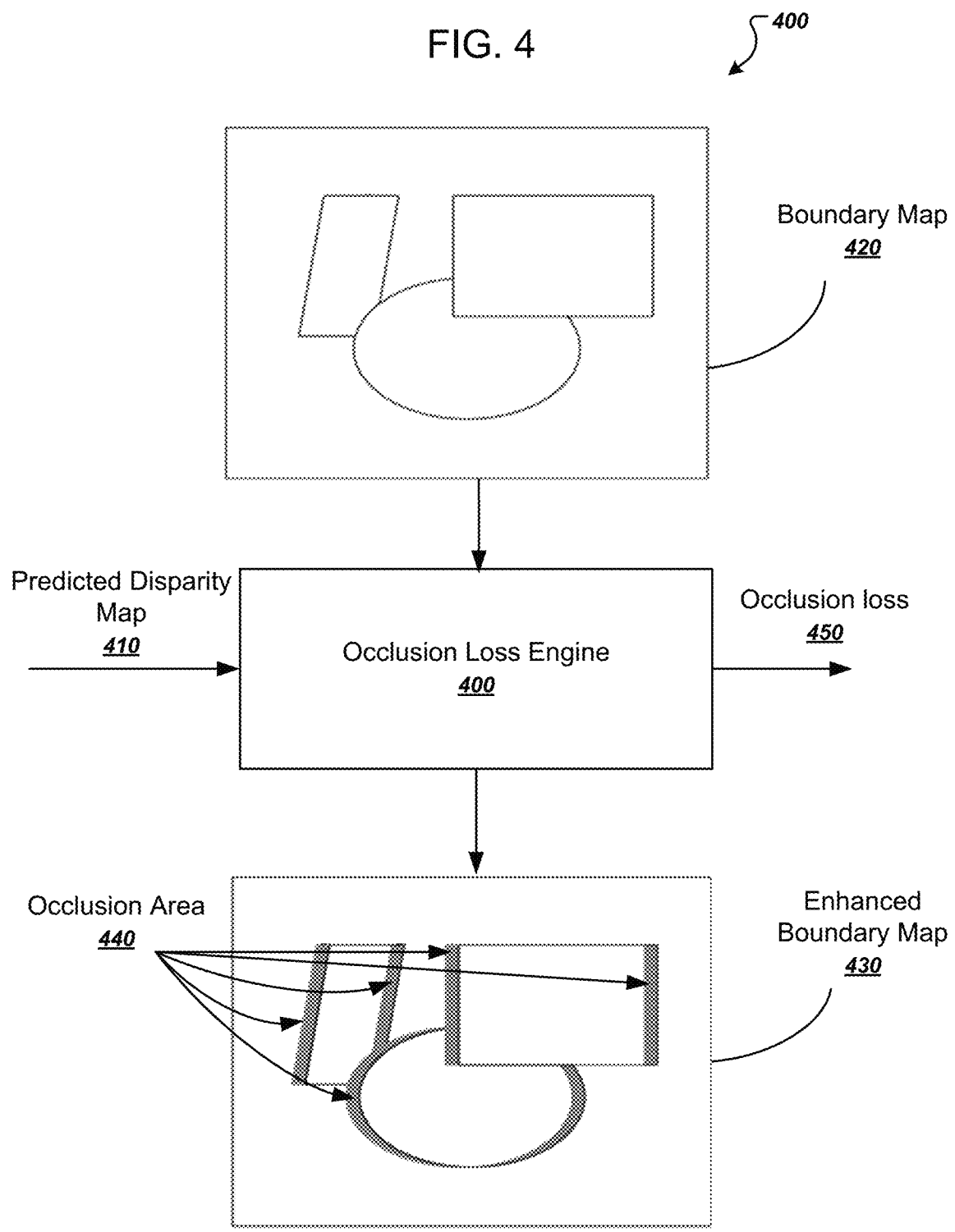
FIG. 4 illustrates an example occlusion loss engine configured to generate an occlusion loss based on an enhanced boundary map with an occlusion area.

FIG. 4 illustrates an example occlusion loss engine 400 configured to generate an occlusion loss 450 based on an enhanced boundary map 430 with occlusion areas 440. The occlusion loss engine 400 can be, for example, the occlusion loss engine 135 of FIG. 1. For convenience, the process can be performed by a system of one or more computers located in one or more locations. For example, a system 100 of FIG. 1, appropriately programmed, can perform the process to generate the occlusion loss 450.

As shown in FIG. 4 and in connection with FIG. 1, the occlusion loss engine 400 can process the boundary map 420 (e.g., boundary map 125 of FIG. 1) and the predicted disparity map 410 (e.g., predicted disparity map 150 of FIG. 1) for generating an occlusion loss 450 (e.g., occlusion loss 165 of FIG. 1).

To generate the occlusion loss 450, the system 100 can be configured to generate an enhanced boundary map 430 with occlusion area 440. The system 100 can overlay a generated occlusion map on top of a boundary map 420 to generate the enhanced boundary map 430. In some implementations, it can be the occlusion loss engine 400 that is configured to generate an occlusion map and overlay it with an boundary map 420 to generate an enhanced boundary map 430.

To generate the enhanced boundary map 430 with occlusion area 440, the system 100 can first generate an occlusion map. To generate the occlusion map, the system 100 can perform operations of the machine learning model 140 of FIG. 1 twice for an input image pair to generate two different disparity maps 150. In particular, the system 100 can generate a first of the two predicted disparity maps based on an original image pair (e.g., a reference image and a target image). To generate a second of the two predicted disparity maps, the system 100 can generate a new image pair by swapping or exchanging the reference image and target image of the original image pair. In this way, the original reference image is now a target image in the new image pair, and the original target image is now a reference image in the new image pair. The system 100 then processes the new image pair using the machine learning model 140 to generate the second predicted disparity map.

In some implementations, the first predicted disparity map is used to sample the second predicted disparity map. An example sampling process includes, for each pixel in a reference image of an image pair, determining a particular coordinate (e.g., (x, y)) for the pixel, obtaining a predicted disparity value $d_1(x, y)$ for the pixel in a first predicted disparity map for the reference image, and obtaining a corresponding disparity value for a corresponding pixel in a second predicted disparity map for a target image of the image pair. Both the first and second predicted disparity maps are generated using the same machine learning model. The corresponding disparity value can be in a form of $d_2(x-d_1(x, y), y)$. After performing the sampling process for a pixel in the reference image, the system can determine a discrepancy value for the pixel using the two disparity values based on a combination of the two disparity values. For example, the discrepancy for the pixel can be an absolute sum of the two disparity values, e.g., $|d_1(x, y)+d_2(x-d_1(x, y), y)|$. The discrepancy values for one or more pixels in the reference image can be used to determine occlusion areas.

The system 100 can compare the first and second predicted disparity maps and determine a discrepancy of disparity values for each pixel in the two disparity maps. The system 100 can determine whether each disparity discrepancy for each pixel satisfies a predetermined threshold. For example, the system 100 can compare the disparity discrepancies against a predetermined threshold value, e.g., value of one, and include the pixels in an occlusion map that each have a discrepancy less than or equal to the threshold value.

The system 100 can combine the occlusion map with an enhanced boundary map 430. The combination process can be, for example, overlaying the occlusion area 440 of the occlusion map onto the enhanced boundary map 430. In some implementations, the system can determine enhanced boundary map 430 by expanding regions/pixels that are predicted as boundary regions/pixels in the boundary map 420 along directions based on the disparity discrepancy, e.g., gradients of the disparity discrepancy that represent respective disparity directions. The expanding width is predetermined based on an overall disparity range.

The occlusion loss is determined based on the combined occlusion map and the enhanced boundary map 430. For example, the occlusion loss is ignored for pixels inside the occlusion area 440, and the occlusion loss is considered non-zero for occluded pixels in the occlusion map that are outside the occlusion area 440.

The occlusion loss function can be determined based on Equations (3)-(5) below:

$$\Delta D(x) = |D_{l \to r}(x) + D_{r \to l}(x - D_{l \to r}(x))| \times \delta(\text{occlusion}) \quad \text{Equation (3)}$$

The terms $D_{l \to r}$ and $D_{r \to l}$ of Equation (3) represent functions for retrieving disparity values for an original image pair and a new image pair after swapping. The delta function $\delta(\text{occlusion})$ of Equation (3) is used to determine whether a pixel falls outside an expanded boundary area (e.g., occlusion areas) of the enhanced boundary map 430. For example, if the pixel falls outside an occlusion area, (occlusion) can output a zero value, and if the pixel falls within the occlusion area, $\delta(\text{occlusion})$ can output a particular non-zero value. The term $\Delta D(x)$ of Equation (3) represents a function for determining the pixel-wise disparity discrepancy for a pixel located at a position x (a vector representing both coordinates in width and height directions, e.g., (x, y)) in a reference image.

The occlusion loss is determined based on Equation (4) as below:

$$\text{Loss}_o = \begin{cases} \sum_c^{R,G,B} f(|I_r^c - I_w^c|), & \text{if } \Delta D \le 1 \\ 0, & \text{if } \Delta D > 1 \end{cases} \quad \text{Equation (4)}$$

The term $\text{Loss}_o$ of Equation (4) represents the occlusion loss 165, the term $I_r$ represents pixel-wise values for the reference image and $I_w$ represents pixel-wise values for a new image that is generated based on the target image by warping the target image with predicted disparity values. For example, if the image pair includes color images, the term $I_r$ can represent pixel-wise RGB values for the reference image. Assuming another term $I_t$ can represent pixel-wise RGB values for the target image, the system can generate the new image (also referred to as a warped image) based on predicted disparity values for the target image, e.g., $d_t(x, y)$. The term $I_w$ can represent pixel-wise RGB values for the warped image. The system can generate values for term $I_w$ by sampling, for each pixel in the generated disparity map for the target image, RGB values in the target image based on the disparity values. For example, the term $I_w$ can be determined based on the equation $I_w(x, y) = I_t(x - d(x, y), y)$.

The occlusion loss 165 is generated by summing the function $f(x)$ for all image channels (e.g., Red, Green, and Blue color channels). The function $f(x)$ is determined based on the Equation (5) below:

$$f(x) = -x^\gamma \log(1-x) \quad \text{Equation (5)}$$

The term $\gamma$ of Equation (5) is a predetermined parameter for the occlusion loss 165.

Figure 5:
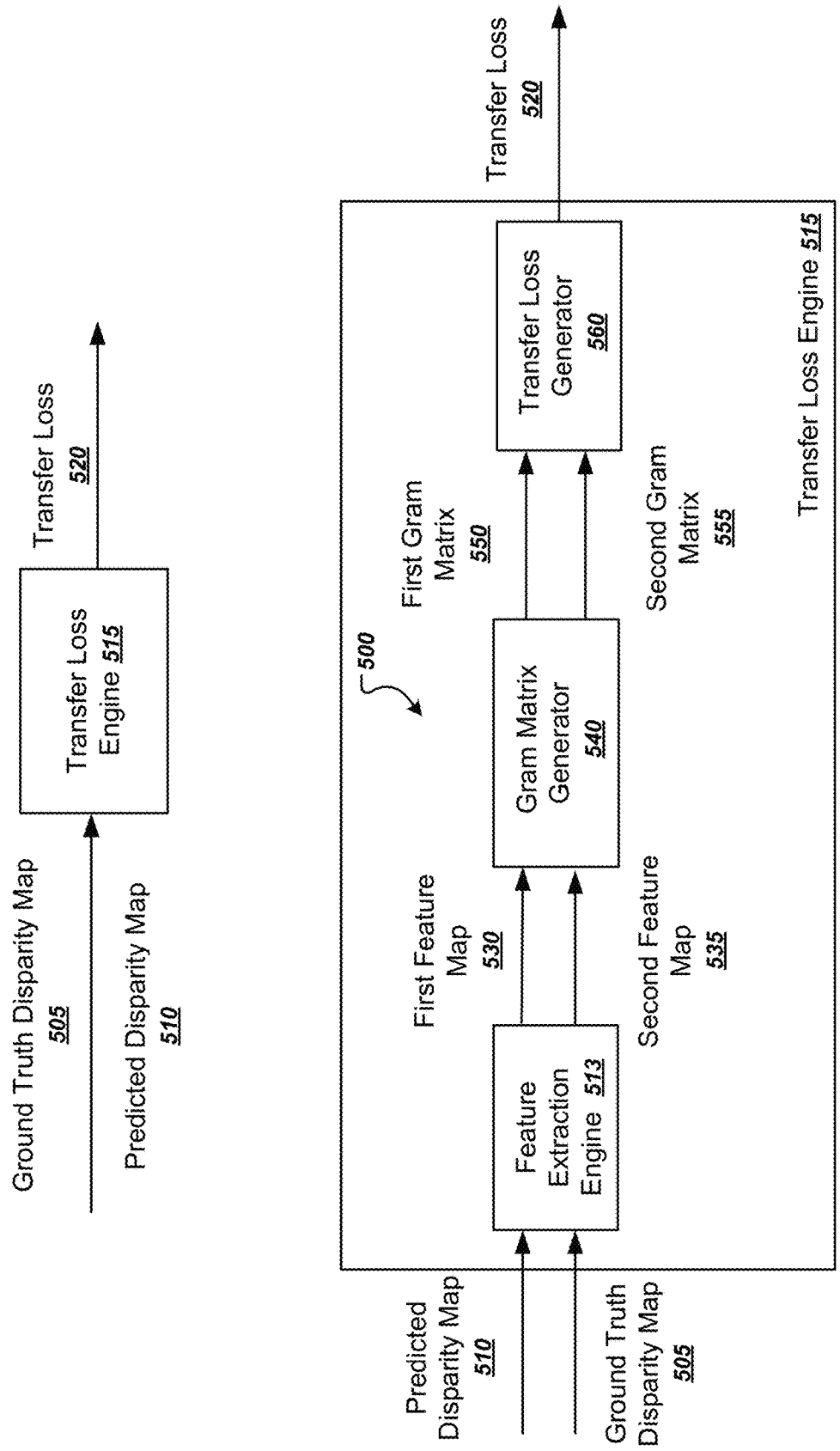
FIG. 5 illustrates an example approach adopted by an example transfer loss engine configured to determine a transfer loss based on a ground truth disparity map.

FIG. 5 illustrates an example approach 500 adopted by an example transfer loss engine 515 configured to determine a transfer loss 520 based on a ground truth disparity map 505. The transfer loss engine 515 can be, for example, the transfer loss engine 137 of FIG. 1. For convenience, the process can be performed by a system of one or more computers located in one or more locations. For example, a system 100 of FIG. 1, appropriately programmed, can perform the process to generate the transfer loss 520.

It is infeasible to simply perform domain transfer techniques to train the machine learning model 140, because the trained machine learning model should be able to generate predictions of disparity maps that are accurate to arbitrary scenes—not only for the scenes that are aligned with one another using the domain transfer techniques. Instead, the described techniques consider that a predicted disparity map (or depth map) and a ground truth disparity map (or depth map) should generally share the same "disparity pattern" for regions inside boundaries, therefore, the described techniques reframe the domain transfer problem as a style transfer problem between the predicted disparity map and the ground truth disparity map.

Most of the existing domain transfer methods aim at aligning the domains of the input image to facilitate transfer from one to another. The adoption of the same idea for the purpose of stereo learning is infeasible as the model is supposed to generalize well to all input scenes. Hence in the present specification, the techniques described focus on the output and take the domain transfer problem as a style transfer between the predicted depth and the ground truth depth, assuming that depths from different scenes share the same "pattern" of each other in those large, continuous, and different areas that are interwoven with sparse and sharp depth information. The ground truth disparity map 505 is equivalent to the ground truth disparity map 155 of FIG. 1. The ground truth disparity map 505 can be generated using computer graphics techniques. For example, the ground truth disparity map 505 can be generated from Monkaa image frames or other suitable computer-generated images.

As shown in FIG. 5, the transfer loss engine 515 can process the predicted disparity map 510 and the ground truth disparity map 505 to generate a transfer loss 520. More specifically, the transfer loss engine 515 can include a feature extraction engine 513. The feature extraction engine 513 can include a machine learning model, e.g., a neural network, configured to process disparity maps to generate corresponding feature maps. For example, the machine learning model can be a VGG 16 neural network, which is a convolution neural network that supports 16 layers. The VGG 16 neural network incorporates 1×1 convolutional layers to make the decision function more nonlinear without changing the receptive fields. The VGG 16 neural network uses small receptive fields (3×3 pixels with a stride of 1). The small-size convolution filters allow the VGG 16 neural network to have a large number of weight layers; of course, more layers lead to improved performance.

The feature extraction engine 513 can generate a first feature map 530 for processing the predicted disparity map 510, which is equivalent to the disparity map 150 of FIG. 1. The feature extraction engine 513 can also generate a second feature map 535 for processing the ground truth disparity map 505. The feature maps 530 and 535 can generally be feature representations of a data item by an ordered collection of numeric values, e.g., a vector that represents the data item as a point in a multi-dimensional feature space. In other words, each feature representation may include numeric values for each of multiple features for the input data item (e.g., input disparity maps).

The transfer loss engine 515 can further include a Gram matrix generator 540 that is configured to process feature maps for generating corresponding Gram matrices. A Gram matrix is a matrix generated by multiplying a matrix with its own transpose. Gram matrices are generally used for analyzing correlations between columns or rows of a matrix. For example, the determinant of a Gram matrix can be used to determine linear independence between vectors in a matrix.

As shown in FIG. 5, the gram matrix generator 540 can process the first feature map 530 to generate a first Gram matrix 550, and process the second feature map 535 to generate a second Gram matrix 555. The generated first and second Gram matrices 550 and 555 are provided to a transfer loss generator 560 to generate the transfer loss 520.

The transfer loss generator 560 included in the transfer loss engine 515 is configured to generate the transfer loss 520 by comparing the first and second Gram matrices 550 and 555. For example, the transfer loss generator 560 can be configured to calculate a sum of squared differences between the first Gram matrix 550 and the second Gram matrix 555, also known as the L2 norm or L2 distance. The Gram loss 520 can be generated based on the L2 distance.

As described above and referring back to FIG. 1, the loss generator 130 is configured to generate a weighted sum of the boundary loss 163, occlusion loss 165, and transfer loss 167 as the total loss 160 for training the machine learning model 145.

Figure 6:
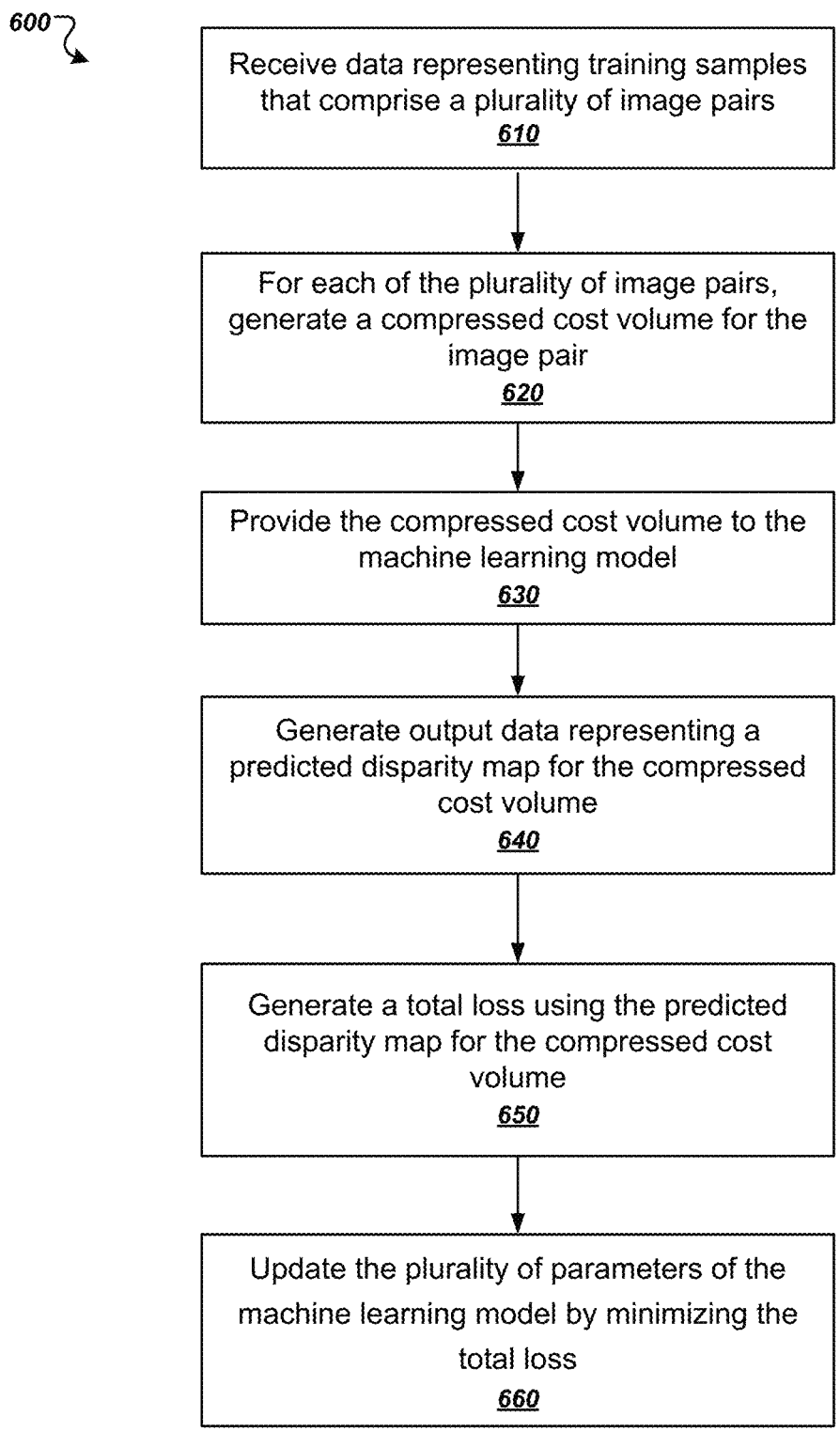
FIG. 6 is a flow diagram of an example process of training a machine learning model for generating depth images for input data.

FIG. 6 is a flow diagram of an example process 600 of training a machine learning model for generating depth images for input data. For convenience, the process can be performed by a system of one or more computers located in one or more locations. For example, a system 100 of FIG. 1, appropriately programmed, can perform the process 600.

The system is configured to train a machine learning model for generating a prediction of a depth map for an input image. The machine learning model includes multiple parameters to be updated during the training. For example, when the machine learning model is a neural network, the parameters can be nodal weights for nodal operations in each layer in multiple network layers. The detailed examples for machine learning models are described at the end of this specification.

The system receives data representing training samples that include multiple image pairs (610). Each image pair includes a target image capturing a particular scene from a first orientation by a first image sensor, and a reference image capturing the particular scene from a second orientation by a second image sensor.

For each of the image pairs, the system generates a compressed cost volume for the image pair (620). The compressed cost volume includes one or more cost values that are selected for each pixel of a reference image in the image pair. To generate the compressed cost volume, the system first generates a cost volume for the image pair using a particular cost function. The cost volume includes multiple cost values for each pixel of the reference image at different disparity levels. For each pixel of the reference image, the system generates a waveform for the pixel with cost values along the axis of the disparity level. The system determines multiple local minimal cost values in the waveform and selects one or more local minimal cost values and their corresponding indices to generate the compressed cost volume. The indices are associated with corresponding disparity levels.

The system provides the compressed cost volume as an input to the machine learning model (630) to generate a predicted disparity map.

The system generates a predicted disparity map for the compressed cost volume using the machine learning model (640).

The system generates a total loss using the predicted disparity map for processing the compressed cost volume (650). The total loss includes a boundary loss, an occlusion loss, and a transfer loss. In particular, the total loss is a weighted sum of the boundary loss, the occlusion loss, and the transfer loss.

To generate the boundary loss, the system generates a boundary map for the image pair using a pre-trained machine learning model. The pre-trained machine learning model can be a semantic boundary machine learning model. The boundary map includes a probability for each pixel of the reference image indicating a likelihood of the pixel being a boundary pixel. The system generates the boundary loss based on the predicted disparity map and the boundary map by obtaining depth gradients or disparity gradients based on the predicted disparity map, generating an enhanced boundary confidence map by normalizing the boundary map, and multiplying the depth gradients and the enhanced boundary confidence map to generate the boundary loss.

To generate the occlusion loss, the system first generates two disparity maps using the machine learning model. More specifically, the system generates a first disparity map for an original image pair. The system then exchanges the targeting image and the reference image of the image pair to generate a swapped image pair. The system generates a second disparity for the swapped image pair. The system further determines whether a disparity discrepancy satisfies a threshold. For example. the system can determine by comparing the disparity values in the first and second disparity maps for each pixel in the reference image, and determining whether the disparity discrepancy is less than or equal to a predetermined threshold value. In response to determining that the disparity discrepancy is less than or equal to the threshold value, the system calculates a pixel-wise loss for the pixel to be aggregated to the occlusion loss; and in response to determine that the disparity discrepancy is greater than the threshold value, the system sets the pixel-wise loss to be zero.

To generate the transfer loss, the system processes the predicted disparity map for the image pair using a neural network to generate a first feature map, and processes a ground truth disparity map for another image pair using the neural network to generate a second feature map. The neural network can include a VGG 16 neural network. The system generates a first Gram matrix for the first feature map and a second Gram matrix for the second feature map. Then the transfer loss is generated based on the first and second Gram matrices by the system. More specifically, the system can determine an L2 distance between the first and second Gram matrices as the transfer loss.

The system updates the parameters of the machine learning model by minimizing the total losses (660). At each time step during the backward operations of the training process, the system updates the parameters for a next time step to reduce the total loss at the current time step.

After the system trains the machine learning model, the system can deploy the trained machine learning model with the updated parameters on an edge device. The edge device can include smartphones, tablets, smartwatches, and any other suitable edge devices. In some implementations, the edge device can be a control unit or a control processor installed in an autonomous vehicle. The edge devices can include one or more processors configured to generate a predicted disparity map for an input image pair by performing inference operations of the trained machine learning model.

The predicted depth image can also be provided to a rendering engine configured to blur one or more pixels in the first image for replicating a depth of field effect. In some implementations, the system can provide the depth image for different external devices for performing different operations. For example, the external device can include a 3D rendering machine configured to render a 3D scene based on the depth map or disparity map of the scene. As another example, the external device can include a shadow generator configured to generate proper shadow effects for the scene based on the depth map or disparity map. Alternatively, the external device can include a 3D model generator configured to generate a 3D model based on the depth map or disparity map. In particular, the 3D model generator can be configured to generate 3D models for components in a dynamic system (e.g., a robotic system), each component having different poses. The 3D generator can generate 3D models of these components based on the depth map or disparity map generated from 2D images capturing these components. Optionally, the external device can include one or more machine learning models configured to generate respective predictions based on the depth map or disparity map in connection with additional data. For example, one of the machine learning models can predict whether a self-driving vehicle, following a trajectory, will collide with an object in the scene within a particular time period.

The term "machine learning model" as used throughout the specification can be neural network models suitable for the tasks described in this specification. Depending on the task, a neural network can be configured, i.e., through training, to receive any kind of digital data input and to generate any kind of score, classification, or regression output based on the input.

In some cases, the neural network is a neural network that is configured to perform an image processing task, i.e., receive an input image and process the input image to generate a network output for the input image. In this specification, processing an input image refers to processing the intensity values of the pixels of the image using a neural network. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance.

As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrasing task, a textual similarity task, a sentiment task, a sentence completion task, a grammaticality task, and so on, that operates on a sequence of text in some natural language.

As another example, the task can be a text to a speech task, where the input is text in a natural language or features of the text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network is configured to perform multiple different individual machine learning tasks, e.g., two or more of the machine learning tasks mentioned above. For example, the neural network can be configured to perform multiple individual natural language understanding tasks. Optionally, the network input can include an identifier for the individual natural language understanding task to be performed on the network input. As another example, the neural network can be configured to perform multiple individual image processing or computer vision tasks, i.e., by generating the output for the multiple different individual image processing tasks in parallel by processing a single input image.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smartphones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory, or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of a message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship between client and server arises by virtue of computer programs running on the respective computers and having a client-server relationship with each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method for training a machine learning model configured to generate a prediction of a depth map for an input image, wherein the machine learning model includes a plurality of parameters to be updated during the training, the method comprising: receiving data representing training samples that include a plurality of image pairs, each image pair includes a target image capturing a particular scene from a first orientation by a first image sensor and a reference image capturing the particular scene from a second orientation by a second image sensor; for each of the plurality of image pairs: generating a compressed cost volume for the image pair, wherein the compressed cost volume includes one or more cost values selected for each pixel of a reference image in the image pair; providing the compressed cost volume as an input to the machine learning model; generating, using the machine learning model, output data representing a predicted disparity map for the compressed cost volume; and generating a total loss using the predicted disparity map for the compressed cost volume, the total loss includes a boundary loss, an occlusion loss, and a transfer loss; and updating the plurality of parameters of the machine learning model by minimizing the total losses.

Embodiment 2 is the method of Embodiment 1, wherein generating the compressed cost volume for the image pair includes: generating a cost volume for the image pair, wherein the cost volume includes a plurality of cost values for each pixel of the reference image of the image pair at different disparity levels; for each pixel of the reference image: generating a waveform for the pixel along an axis of disparity level based on the plurality of cost values for the pixel; and determining a plurality of local minima of the plurality of cost values in the waveform; and generating the compressed cost volume for the reference image by selecting one or more local minima of the plurality of local minima and their corresponding disparity levels.

Embodiment 3 is the method of Embodiment 1 or 2, further comprising generating the boundary loss for the image pair, the generating comprising: generating a boundary map for the image pair using a trained machine learning model, wherein the boundary map includes a probability for each pixel of the reference image indicating a likelihood of the pixel being a boundary pixel; and generating a boundary loss for the image pair based on the predicted disparity map and the boundary map, comprising: generating depth gradients based on the predicted disparity map; generating an enhanced boundary confidence map based on the boundary map; and generating the boundary loss by multiplying the depth gradients and the enhanced boundary confidence map.

Embodiment 4 is the method of any one of Embodiments 1-3, further comprising generating the occlusion loss for the image pair, the generating comprising: exchanging the target image and the reference image of the image pair to generate a swapped image pair; generating, using the machine learning model, data representing a predicted second disparity map for the swapped image pair; and generating the occlusion loss for the image pair based on the predicted disparity map and the predicted second disparity map.

Embodiment 5 is the method of Embodiment 4, wherein generating the occlusion loss for the image pair based on the predicted disparity map and the second disparity map, further includes: for each pixel in the reference image of the image pair: determining a disparity discrepancy by comparing the disparity value for the pixel from the predicted disparity map and the predicted second disparity map; determining whether the disparity discrepancy is less than or equal to a threshold value; in response to determining that the disparity discrepancy is less than or equal to the threshold value, calculating a pixel-wise loss for the pixel to be aggregated to the occlusion loss; and in response to determining that the disparity discrepancy is greater than the threshold value, setting the pixel-wise loss to be zero.

Embodiment 6 is the method of any one of Embodiments 1-5, further comprising generating the transfer loss for the image pair, the generating comprising: processing the predicted disparity map for the image pair using a neural network to generate a first feature map; processing a ground truth disparity map for another image pair using the neural network to generate a second feature map; generating data representing a first Gram matrix for the first feature map; generating data representing a second Gram matrix for the second feature map; and generating the transfer loss for the image pair based on a sum of squared distances between the first and second Gram matrices.

Embodiment 7 is the method of any one of Embodiments 1-6, further comprising: deploying the trained machine learning model with the updated plurality of parameters on an edge device; and generating a predicted disparity map for an input image pair by performing inference operations of the trained machine learning model for processing the input image pair.

Embodiment 8 is a system comprising one or more computers and one or more storage devices storing instructions that when executed by one or more computers cause the one or more computers to perform respective operations, the operations comprising the method of any one of Embodiments 1-7.

Embodiment 9 is one or more computer-readable storage media storing instructions that when executed by one or more computers cause the one or more computers to perform respective operations, the respective operations comprising the method of any one of Embodiments 1-7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method for training a machine learning model configured to generate a prediction of a depth map for an input image, wherein the machine learning model includes a plurality of parameters to be updated during the training, the method comprising:
   receiving data representing training samples that comprise a plurality of image pairs, each image pair comprises a target image capturing a particular scene from a first orientation by a first image sensor and a reference image capturing the particular scene from a second orientation by a second image sensor;
   for each of the plurality of image pairs:
     generating a compressed cost volume for the image pair, wherein the compressed cost volume comprises one or more cost values selected for each pixel of a reference image in the image pair;
     providing the compressed cost volume as an input to the machine learning model;
     generating, using the machine learning model, output data representing a predicted disparity map for the compressed cost volume; and
     generating a total loss using the predicted disparity map for the compressed cost volume, the total loss comprising a boundary loss, an occlusion loss, and a transfer loss; and
   updating the plurality of parameters of the machine learning model by minimizing the total losses.

2. The method of claim 1, wherein generating the compressed cost volume for the image pair comprises:
generating a cost volume for the image pair, wherein the cost volume includes a plurality of cost values for each pixel of the reference image of the image pair at different disparity levels;
for each pixel of the reference image:
generating a waveform for the pixel along an axis of disparity level based on the plurality of cost values for the pixel; and
determining a plurality of local minima of the plurality of cost values in the waveform; and
generating the compressed cost volume for the reference image by selecting one or more local minima of the plurality of local minima and their corresponding disparity levels.

3. The method of claim 1, further comprising generating the boundary loss for the image pair, the generating comprising:
generating a boundary map for the image pair using a trained machine learning model, wherein the boundary map includes a probability for each pixel of the reference image indicating a likelihood of the pixel being a boundary pixel; and
generating a boundary loss for the image pair based on the predicted disparity map and the boundary map, comprising:
generating depth gradients based on the predicted disparity map;
generating an enhanced boundary confidence map based on the boundary map; and
generating the boundary loss by multiplying the depth gradients and the enhanced boundary confidence map.

4. The method of claim 1, further comprising generating the occlusion loss for the image pair, the generating comprising:
exchanging the target image and the reference image of the image pair to generate a swapped image pair;
generating, using the machine learning model, data representing a predicted second disparity map for the swapped image pair; and
generating the occlusion loss for the image pair based on the predicted disparity map and the predicted second disparity map.

5. The method of claim 4, wherein generating the occlusion loss for the image pair based on the predicted disparity map and the predicted second disparity map, further comprises:
for each pixel in the reference image of the image pair:
determining a disparity discrepancy based on disparity values for the pixel from the predicted disparity map and the predicted second disparity map;
determining whether the disparity discrepancy is less than or equal to a threshold value;
in response to determining that the disparity discrepancy is less than or equal to the threshold value, calculating a pixel-wise loss for the pixel to be aggregated to the occlusion loss; or
in response to determining that the disparity discrepancy is greater than the threshold value, setting the pixel-wise loss to be zero.

6. The method of claim 1, further comprising generating the transfer loss for the image pair, the generating comprising:
processing the predicted disparity map for the image pair using a neural network to generate a first feature map;
processing a ground truth disparity map for another image pair using the neural network to generate a second feature map;
generating data representing a first Gram matrix for the first feature map;
generating data representing a second Gram matrix for the second feature map; and
generating the transfer loss for the image pair based on a sum of squared distances between the first Gram matrix and the second Gram matrix.

7. The method of claim 1, further comprising:
deploying the trained machine learning model with the updated plurality of parameters on an edge device; and
generating a predicted disparity map for an input image pair by performing inference operations of the trained machine learning model for processing the input image pair.

8. A system comprising one or more computers and one or more storage devices storing instructions that when executed by one or more computers cause the one or more computers to perform respective operations for training a machine learning model configured to generate a prediction of a depth map for an input image, wherein the machine learning model includes a plurality of parameters to be updated during the training, the operations comprising:
receiving data representing training samples that comprise a plurality of image pairs, each image pair comprises a target image capturing a particular scene from a first orientation by a first image sensor and a reference image capturing the particular scene from a second orientation by a second image sensor;
for each of the plurality of image pairs:
generating a compressed cost volume for the image pair, wherein the compressed cost volume comprises one or more cost values selected for each pixel of a reference image in the image pair;
providing the compressed cost volume as an input to the machine learning model;
generating, using the machine learning model, output data representing a predicted disparity map for the compressed cost volume; and
generating a total loss using the predicted disparity map for the compressed cost volume, the total loss comprising a boundary loss, an occlusion loss, and a transfer loss; and
updating the plurality of parameters of the machine learning model by minimizing the total losses.

9. The system of claim 8, wherein generating the compressed cost volume for the image pair comprises:
generating a cost volume for the image pair, wherein the cost volume includes a plurality of cost values for each pixel of the reference image of the image pair at different disparity levels;
for each pixel of the reference image:
generating a waveform for the pixel along an axis of disparity level based on the plurality of cost values for the pixel; and
determining a plurality of local minima of the plurality of cost values in the waveform; and
generating the compressed cost volume for the reference image by selecting one or more local minima of the plurality of local minima and their corresponding disparity levels.

10. The system of claim 8, wherein the operations further comprise generating the boundary loss for the image pair, the generating comprising:

generating a boundary map for the image pair using a trained machine learning model, wherein the boundary map includes a probability for each pixel of the reference image indicating a likelihood of the pixel being a boundary pixel; and generating a boundary loss for the image pair based on the predicted disparity map and the boundary map, comprising:
generating depth gradients based on the predicted disparity map;
generating an enhanced boundary confidence map based on the boundary map; and
generating the boundary loss by multiplying the depth gradients and the enhanced boundary confidence map.

11. The system of claim 8, wherein the operations further comprise generating the occlusion loss for the image pair, the generating comprising:
exchanging the target image and the reference image of the image pair to generate a swapped image pair;
generating, using the machine learning model, data representing a predicted second disparity map for the swapped image pair; and
generating the occlusion loss for the image pair based on the predicted disparity map and the predicted second disparity map.

12. The system of claim 11, wherein generating the occlusion loss for the image pair based on the predicted disparity map and the predicted second disparity map, further comprises:
for each pixel in the reference image of the image pair:
determining a disparity discrepancy based on disparity values for the pixel from the predicted disparity map and the predicted second disparity map;
determining whether the disparity discrepancy is less than or equal to a threshold value;
in response to determining that the disparity discrepancy is less than or equal to the threshold value, calculating a pixel-wise loss for the pixel to be aggregated to the occlusion loss; or
in response to determining that the disparity discrepancy is greater than the threshold value, setting the pixel-wise loss to be zero.

13. The system of claim 8, wherein the operations further comprise generating the transfer loss for the image pair, the generating comprising:
processing the predicted disparity map for the image pair using a neural network to generate a first feature map;
processing a ground truth disparity map for another image pair using the neural network to generate a second feature map;
generating data representing a first Gram matrix for the first feature map;
generating data representing a second Gram matrix for the second feature map; and
generating the transfer loss for the image pair based on a sum of squared distances between the first Gram matrix and the second Gram matrix.

14. The system of claim 8, wherein the operations further comprise:
deploying the trained machine learning model with the updated plurality of parameters on an edge device; and
generating a predicted disparity map for an input image pair by performing inference operations of the trained machine learning model for processing the input image pair.

15. One or more non-transitory computer-readable storage media storing instructions that when executed by one or more computers cause the one or more computers to perform respective operations for training a machine learning model configured to generate a prediction of a depth map for an input image, wherein the machine learning model includes a plurality of parameters to be updated during the training, the operations comprising:
receiving data representing training samples that comprise a plurality of image pairs, each image pair comprises a target image capturing a particular scene from a first orientation by a first image sensor and a reference image capturing the particular scene from a second orientation by a second image sensor;
for each of the plurality of image pairs:
generating a compressed cost volume for the image pair, wherein the compressed cost volume comprises one or more cost values selected for each pixel of a reference image in the image pair;
providing the compressed cost volume as an input to the machine learning model;
generating, using the machine learning model, output data representing a predicted disparity map for the compressed cost volume; and
generating a total loss using the predicted disparity map for the compressed cost volume, the total loss comprising a boundary loss, an occlusion loss, and a transfer loss; and
updating the plurality of parameters of the machine learning model by minimizing the total losses.

16. The one or more non-transitory computer-readable storage media of claim 15, wherein generating the compressed cost volume for the image pair comprises:
generating a cost volume for the image pair, wherein the cost volume includes a plurality of cost values for each pixel of the reference image of the image pair at different disparity levels;
for each pixel of the reference image:
generating a waveform for the pixel along an axis of disparity level based on the plurality of cost values for the pixel; and
determining a plurality of local minima of the plurality of cost values in the waveform; and
generating the compressed cost volume for the reference image by selecting one or more local minima of the plurality of local minima and their corresponding disparity levels.

17. The one or more non-transitory computer-readable storage media of claim 15, wherein the operations further comprise generating the boundary loss for the image pair, the generating comprising:
generating a boundary map for the image pair using a trained machine learning model, wherein the boundary map includes a probability for each pixel of the reference image indicating a likelihood of the pixel being a boundary pixel; and
generating a boundary loss for the image pair based on the predicted disparity map and the boundary map, comprising:
generating depth gradients based on the predicted disparity map;
generating an enhanced boundary confidence map based on the boundary map; and
generating the boundary loss by multiplying the depth gradients and the enhanced boundary confidence map.

18. The one or more non-transitory computer-readable storage media of claim 15, wherein the operations further comprise generating the occlusion loss for the image pair, the generating comprising:
- exchanging the target image and the reference image of the image pair to generate a swapped image pair;
- generating, using the machine learning model, data representing a predicted second disparity map for the swapped image pair; and
- generating the occlusion loss for the image pair based on the predicted disparity map and the predicted second disparity map.

19. The one or more non-transitory computer-readable storage media of claim 18, wherein generating the occlusion loss for the image pair based on the predicted disparity map and the predicted second disparity map, further comprises:
- for each pixel in the reference image of the image pair:
  - determining a disparity discrepancy based on disparity values for the pixel from the predicted disparity map and the predicted second disparity map;
  - determining whether the disparity discrepancy is less than or equal to a threshold value;
  - in response to determining that the disparity discrepancy is less than or equal to the threshold value, calculating a pixel-wise loss for the pixel to be aggregated to the occlusion loss; or
  - in response to determining that the disparity discrepancy is greater than the threshold value, setting the pixel-wise loss to be zero.

20. The one or more non-transitory computer-readable storage media of claim 15, wherein the operations further comprise generating the transfer loss for the image pair, the generating comprising:
- processing the predicted disparity map for the image pair using a neural network to generate a first feature map;
- processing a ground truth disparity map for another image pair using the neural network to generate a second feature map;
- generating data representing a first Gram matrix for the first feature map;
- generating data representing a second Gram matrix for the second feature map; and
- generating the transfer loss for the image pair based on a sum of squared distances between the first Gram matrix and the second Gram matrix.

* * * * *